H. FRASCH.
APPARATUS FOR THE MANUFACTURE OF SALT.
APPLICATION FILED APR. 18, 1892.
1,125,998.
Patented Jan. 26, 1915.
2 SHEETS—SHEET 1.
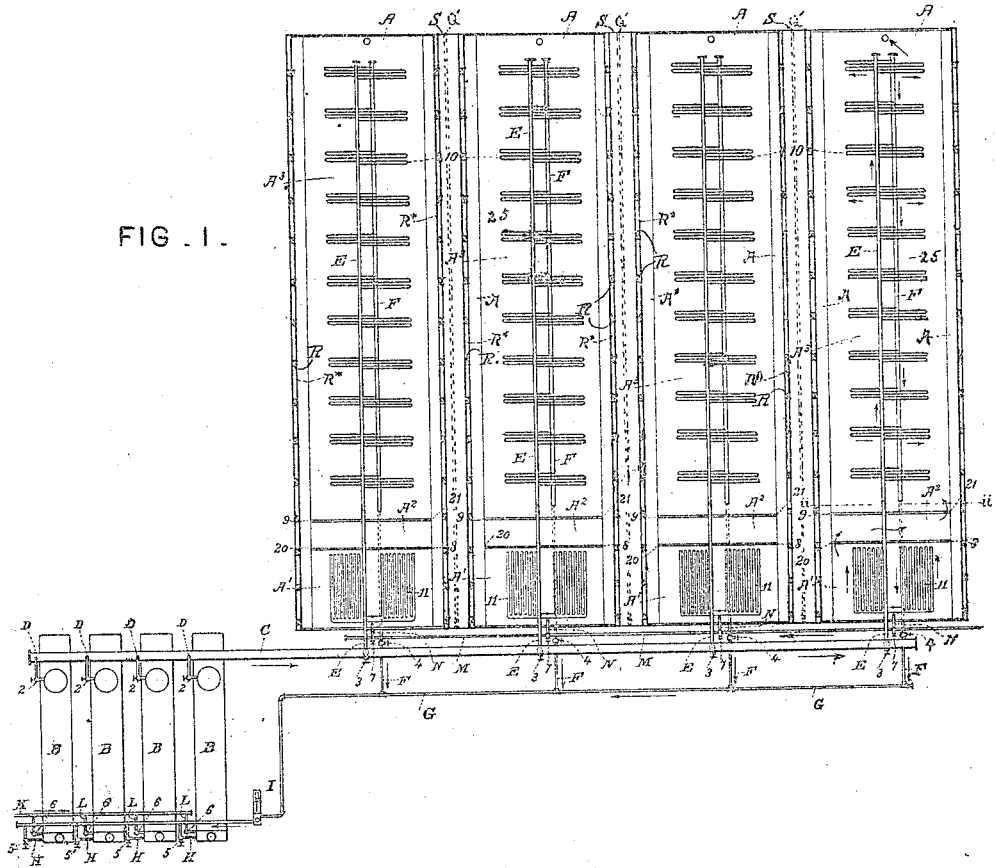
FIG. I.
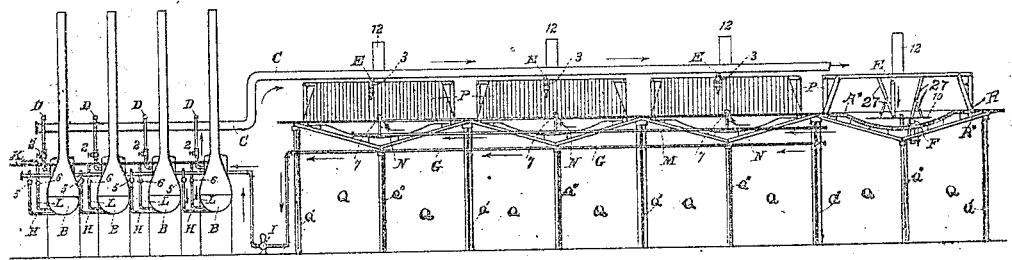
FIG. II.
FIG. III.

H. FRASCH.
APPARATUS FOR THE MANUFACTURE OF SALT.
APPLICATION FILED APR. 18, 1892.
1,125,998.
Patented Jan. 26, 1915.
2 SHEETS—SHEET 2.
FIG. IV.
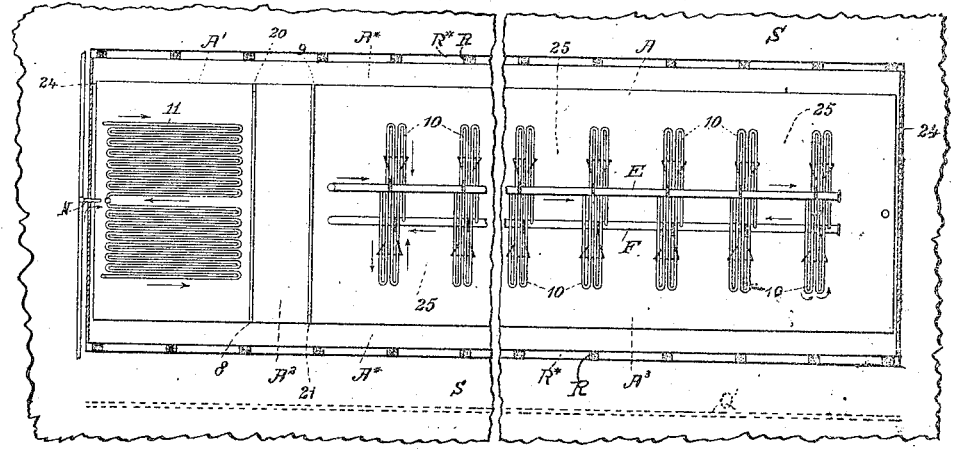
FIG. V.
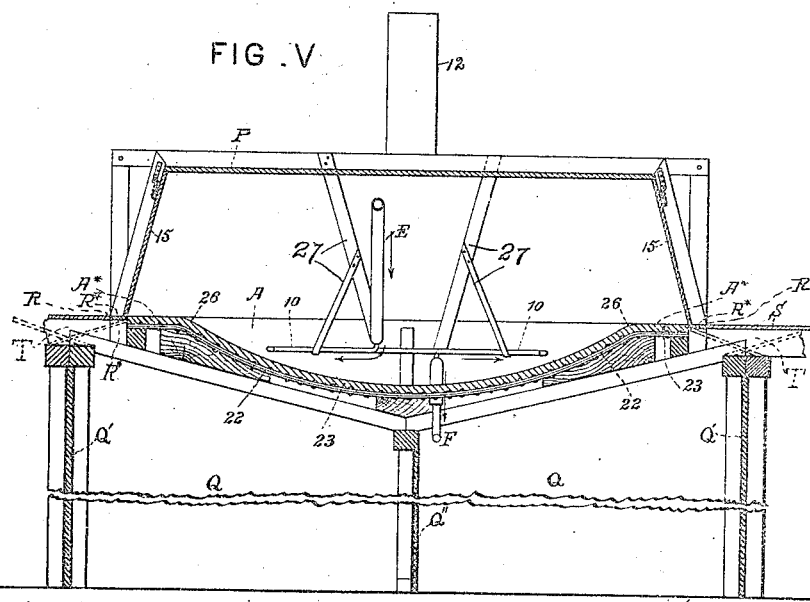
Attest:
Geo. T. Smallwood.
R. E. Auld.
Inventor:
Herman Frasch
by Chas. J. Hedrick
his attorney

UNITED STATES PATENT OFFICE.

HERMAN FRASCH, OF CLEVELAND, OHIO, ASSIGNOR TO UNITED SALT COMPANY, OF CLEVELAND, OHIO, A CORPORATION OF OHIO.

APPARATUS FOR THE MANUFACTURE OF SALT.

1,125,998.  Specification of Letters Patent.  Patented Jan. 26, 1915.

Application filed April 18, 1899. Serial No. 489,652.

*To all whom it may concern:*

Be it known that I, HERMAN FRASCH, a citizen of the United States, residing at Cleveland, in the county of Cuyahoga and State of Ohio, have invented certain new and useful Improvements in Apparatus for the Manufacture of Salt, of which the following specification is a full, clear, and exact description.

This invention relates more particularly to the manufacture of salt by preliminarily heating the brine to separate impurities, evaporating brine to precipitate the salt, and finally draining, drying and storing the salt, and comprises new or improved apparatus for the purpose. In accordance with said invention the brine, after it has been subjected to sufficient preliminary heating to liberate the impurities, is allowed quietly to settle (active heating being withdrawn) and gradually to evaporate and become somewhat lowered in temperature in a hot steam filled atmosphere, such as furnished by inclosing the settling chamber in the same hood which incloses one or more other chambers wherein active evaporation is progresing. In this operation the impurities settle out leaving the brine in a cleansed condition for the next or graining operation, in which the brine is again subjected to heat to evaporate the water for the production, by crystallization or graining, of the salt. To effect this intermediate cleasing of the brine, the latter is preferably exposed in a shallow layer in suitable shallow pans. The preliminary heating and the graining are also preferably performed in shallow pans, exposing a large evaporating surface in comparison with the body of brine. The preliminary heating of the brine is preferably carried to ebullition and the brine brought to saturation (or nearly so) before it is subjected to the intermediate cleansing. In this cleansing operation salt is precipitated as well as the impurities; but any such loss is more than offset by the more thorough removal of impurities.

In order that the operation may be carried on in the best manner, separate chambers or compartments are provided which are inclosed in the same hood and in which the preliminary heating, the intermediate cleansing and the graining may be carried on simultaneously, such chambers or compartments being connected in series so that the brine may be conducted from one to the other. The brine after having its temperature raised to effect precipitation in the preliminary heater is withdrawn from the heat, which by establishing currents tends to maintain the impurities in suspension, and on its way to the grainer reposes for a time in the cleansing chamber wherein it is no longer exposed to currents but falls gradually somewhat in temperature by radiation and quiet evaporation in the hot steam filled air and whence it passes still hot into the grainer. Practically brine from the precipitating heater may enter the settler or cleansing chamber while the cleansed brine is passing out into the grainer, thus making the operation continuous. The arrangement of separate chambers or compartments in series for these operations is economical, since the other chambers or compartments may be small in comparison with the grainers.

Further in accordance with the invention a salt table on which the salt may be placed for drainage is inclosed with an evaporating pan by a hood which fits closely around the salt table and is provided with suitable flues or openings for the escape of the vapors from the pan. By thus inclosing a salt table with the pan in the hood, the salt draining on said table is exposed to a hot vaporous atmosphere and also to heat radiated or reflected thereon from the hood, and therefore is subjected to conditions adapted to permit it to drain effectively, the impurities being carried away in the mother liquor.

So far as I am aware it is new broadly to drain the salt under a hood which incloses also the grainer or evaporator, and which thus increases the temperature of the atmosphere surrounding the salt and also radiates or reflects heat on to the salt in draining; and the invention extends generally to this improvement whether carried out by a salt table or other drainage receptacle or receptacles.

The salt tables, or drainage receptacles, are most advantageously placed at the margin of the pan, as they are thus best adapted for the reception and removal of the salt, while the draining of the salt takes place there as efficiently as, is not better than, in other parts of the hood. An additional improvement in this connection consists in a salt pan or evaporator provided with a salt table and having the pan bottom sloping up to meet such table, in combination with a hood inclosing the pan and its table. The sloping bottom permits the salt to be raked easily on to the salt tables, and when the doors of the hood are open the draft into the hood carries the vapor away from the workman who rakes the salt.

Further in accordance with the invention new and useful improvements, arrangements, and combinations of heating pipe in the evaporating pans, of evaporating pans and steam generators and storage or drying bins, and of various parts of the works are effected as will be explained below.

In the accompanying drawings which form part of this specification, what is considered the best mode of carrying out the invention is illustrated.

Figure I is a plan of the salt works with the hoods of the evaporating pans removed, Fig. II is an elevation of the same, partly in section, with the hoods in place, Fig. III is a partial view in longitudinal section on an enlarged scale, Fig. IV is a partial plan of one of the evaporating pans with the hood removed, and Fig. V is a cross section of one of said pans on a still larger scale.

The evaporating pans A, of which a number are used, are of similar or identical construction and arrangement. In each of them A′ is the preliminary heating chamber, A² the cleansing chamber and A³ the graining or pure salt chamber, they being formed by dividing the shallow pan A by the partitions 8 and 9. As shown the partitions are placed close to each other near one end of the pan leaving the graining chamber much larger than the others. The chamber A′ communicates with the chamber A² by an overflow or opening 20 at the surface of the brine at one end of the partition 8, and the chamber A² with the chamber A³ by an overflow or opening 21 at the surface of the brine at the opposite end of the partition 9. Orifices 13 and 14 are also formed in the bottom of the partitions for cleansing out. In use they soon become clogged and do not require to be plugged. In the chamber A′ are numerous heating pipes 11 and in the chamber A³ are heating pipes 10 with less heating surface as compared with the size of the chambers than the pipes 11, while the intermediate chamber A² is without such pipes. Above the several compartments of the pan is a hood P, provided with vapors escapes or flues 12 and hinged doors 15 which give access to the interior.

The brine to be boiled down enters the chamber A′ by the brine feed pipe N, passes by the overflow 20 into the chamber A² and thence by the overflow 21 into the grainer A³. The brine enters the chamber A′ at a strength of about or above ninety per cent. (90%) of salt saturation, and is brought to ebullition and to salt saturation (or nearly so) before it passes into the chamber A². The result of this preliminary heating in the chamber A′ is that the gypsum and other impurities are liberated, and in part these impurities settle out in the said chamber; that which does not settle passes out with the brine. In the chamber A² the saturated brine boiling hot reposes and quietly and gradually evaporates, becoming somewhat reduced in temperature. During this settling the atmosphere above the brine is filled with hot vapor arising from the brine which moderates the evaporation and reduction of temperature in chamber A². The result of this is that the particles in suspension settle out, and a further precipitation of salt and impurities takes place which also settle out, so that by the time the brine, which is still hot, leaves this chamber it is ready to be evaporated for salt. This evaporation or graining is preferably effected at a lower temperature than exists in the preliminary heating chamber A′, although of course, the temperature may be high or low according to the character of salt which it is desired to obtain. The hood over the pan, not only protects the brine in the cleansing chamber from air currents, but it also effects a slight gradual cooling and evaporation of the brine therein by maintaining a hot steam filled atmosphere above the brine and by radiation thereon, as well as makes it less costly to maintain appropriate temperatures in the chambers A′ and A³.

Each pan A shown is provided with a salt table A* forming a broad margin on each side of the said pan A, whose bottom slopes upward to meet said salt table, so that the latter constitutes a continuation of the bottom permitting the salt easily to be raked from the bottom of the vat on to the salt table. The walls of the pan (see Fig. V) at least on the inside of the same as at 23, are composed of brine proof cement or hardened plastic material, the pan shown consisting of an outer shell 22 of boiler plate and a lining 23 of suitable thickness of German or Hamburg cement, which is applied in plastic condition and allowed to harden. As shown the shell 22 and lining 23 both extend to and beyond the edge of the sloping bottom of the pan, so as to form the marginal salt table A* on each side of the pan. The ends 24 of the pan and the partitions 8 and 9 have their faces coated with the brine proof cement or hardened plastic material. The partitions divide the pan into the series of chambers A' A² A³ as before described.

The iron shell may be composed of as many plates or pieces as desired. As shown the pieces are riveted together and the rivet heads on the inside are embedded in the lining which gives a smooth surface over which the crystallized salt can be raked easily and from which there is no danger of discoloration.

It is preferred to have the bottom of the pan A rounded (concave) in the middle and also rounded (convex) at 26 where it meets the salt table A*, both the iron shell 22 and the cement lining 23 being rounded at these points, as this form not only makes raking easier but also facilitates the application of the cement and exposes it less to wear and to stresses tending to crack the cement.

The crystallized salt is raked over the sloping bottom of the graining chamber A³ on to the salt table A* where it is allowed to drain. Above the pan A and as shown inclosing the salt tables and all three chambers A' A² A³, is the hood P built over the pan and provided with vapors escapes 12 and doors 15. These doors are hinged near their upper ends so that they can be swung up to give access to the pans. During the raking of any part of the pan, the door opposite that part is raised and the inward draft carries the vapor away from the attendant who performs the raking. When the salt has been raked on to the salt table A*, which constitutes the draining receptacle, the doors are closed, and the loaded salt table being inclosed with the steam heated pan in the hood, the salt thereon drains in a hot vaporous atmosphere with exposure to heat radiated or reflected on to the salt.

The coils 10 in the chamber A³ are supplied with steam from the main E and deliver the waste steam or water of condensation into the return main F. As shown the mains are placed in the middle or deepest part of the pan, the return main F at a lower level, and the coils 10 are placed at an intermediate level between the mains, and project above the sloping bottom of the pans. The coils 10 are separated from each other leaving lane like spaces 25 across the ends of which are the sloping bottom of the pan and the salt tables. The coils are supported in the pan from the roof by the suspension bars 27 leaving a raking space under the coils. With this arrangement, the heating capacity of the coils is distributed in accordance with the volume of brine in the different parts of the pan, being greatest where the brine is deepest. The lane like spaces 25 facilitate the raking between the coils and also enable the workman to rake under the coils more readily. Doors 15 of the hood are opposite the lane like spaces 25.

The evaporating pans A are heated by steam from a number of steam generators B, there being as shown a generator for each evaporator although this identity of number is not essential. All the steam generators supply steam to a trunk main C from which all the evaporating pans receive their supply. A branch pipe D connects the steam space or dome of each generator B with the trunk main C and a stop cock 2 is provided for each branch D so that the supply from each generator can be regulated independently of the others. A branch main E leads from the trunk main C to each evaporating pan A and is provided with a cock 3 so that the supply for each can be regulated independently of the others. For each branch main E is a return branch main F into which the heating coils 10 of the evaporating pans deliver their waste steam or water of condensation; and the branch return mains F all deliver their waste steam or condensed water into the return trunk main G and are each provided with a stop cock 4. From the return trunk main G a branch pipe H leads to the water space of each steam generator and is provided with a stop cock 5. By this arrangement it is possible to regulate the steam for each evaporator or evaporating pan and to apportion the duty of supplying it among the generators, and to regulate also the amount of condensed water which shall be delivered to each boiler; moreover any generator or evaporator can be cut off if desired. In the return trunk main G is placed a pump I the purpose of which is to assist the circulation of the fluid through the generators, mains, pipes and evaporators; but it is not essential to employ it as a circulation may be secured by gravity, or if forcing means are desired other contrivances can be used.

In order to supply the steam generators with the additional water which they may need, a water supply pipe K is connected with the water space of each generator B by a branch pipe L in which is a cock 6. A brine feed pipe M is connected with each evaporating pan A by a branch pipe N in which is a cock 7. The brine from the brine feed pipe M is delivered through the branch pipe N into the preliminary heating chamber A' and flows thence by the overflows 20 and 21 successively into the chambers A² and A³ which thus communicate in series with each other and with the chamber A' by said overflows.

The bins Q are placed at a lower level and in part underneath the pans A. A number of these pans are shown arranged parallel with each other with walks between and the bins are formed under these pans and walks. The bins are separated by partitions Q' Q'' which run parallel with the pans A, and access is given to them from above through receiving openings R which extend along the salt tables A*, the latter constituting continuous margins on the salt pans. The openings R are ordinarily closed by traps or removable boards R*. The floor openings are placed in such proximity to the salt tables that the salt can be shoveled therefrom directly into the bins; as shown they are just outside the salt tables A*. When the salt table has been separated by evaporation of the brine in any pan A by means of the heat from coils 10, it is raked up the inclined floor onto a salt table A* on which it is allowed to rest until it is sufficiently dry to be pitched into the bin. This drying of the salt on the salt table is facilitated by the use of the hood P which retains the heat and also radiates or reflects it down on the salt table. When the salt on the salt table is sufficiently dry, the flooring R* is removed and the attendant can then shovel it directly into the bin. Thus from the formation of the salt crystals in the pan to the storage to await shipment the only labor required is that of raking the salt on to the salt tables and of shoveling it thence into the bin, both of which are easily performed.

In order that the atmosphere in the bin may be kept drier, the undersides of the pans are exposed so that they form heaters for the bins. As shown they form part of the roof of the bins and thus radiate down on the salt from above, and exercise the greater effect on the salt last introduced into the bin.

In order to provide more than one bin for receiving the salt by shoveling directly from the salt tables, openings near the salt tables are provided giving access to different bins either directly or by means of chutes. As shown two bins come together under the walk S between two graining pans A, the partition Q' which divides them running parallel with the pans midway between them. The walk S is so narrow that a workman can shovel the salt from the salt table A* on either side of the walk into the opening R on the other. He may therefore shovel the salt into either bin. Instead of pitching across the walk a chute T formed of a removable board as indicated in dotted lines, may be arranged under the opening next to the salt table and across the partition Q' so as to deliver the salt into the next bin. Preferably partitions Q'' are placed under the middle of the pans lengthwise of the same, thus providing two bins for each pan.

I claim as my invention or discovery:—

1. The combination with a grainer, and a preliminary precipitator, of an intermediate cleansing chamber connected with said precipitator and said grainer, and a vapor confining hood inclosing said intermediate chamber and one of the others, said precipitator and grainer being each provided with heating means, and said intermediate chamber being constructed and arranged for the repose of the brine on its way from the precipitator to the grainer, substantially as described.

2. The combination with a grainer, and a preliminary heater, of an intermediate cleansing chamber connected with said heater and said grainer, and means whereby a hot vapor-filled atmosphere is confined over the brine in said intermediate chamber, and steam is supplied to said atmosphere otherwise than from the brine in said intermediate chamber, substantially as described.

3. The combination of the preliminary heating chamber, the brine-delivering means for said chamber, the cleansing chamber communicating with the first mentioned chamber, means for confining an atmosphere over the brine in said cleansing chamber and supplying steam to said atmosphere otherwise than from the brine in said cleansing chamber, the grainer of greater holding capacity than either of the other chambers mentioned, and the heating means for said grainer having a suitably smaller heating surface in comparison with the holding capacity than the heating means for said preliminary heating chamber, so as to cause ebullition in the latter while quiet evaporation goes on in the grainer, substantially as described.

4. The evaporating pan divided by partitions into three compartments, communicating in series, and provided with the heating coils exclusively in the end compartments and with the vapor confining hood over all, substantially as described.

5. The evaporating pan in the form of a shallow pan with bottom sloping upward from the middle portion outwardly to and above the brine level, divided into a preliminary heating and an intermediate cleansing and a graining chamber by partitions and provided with openings in said partitions at the brine level near the margins of the pan where the layers of brine are very shallow, said chambers communicating in series with each other through said openings, substantially as described.

6. A salt pan or evaporator provided above the brine level with a brine-discharging salt table and having a vapor-confining hood which fits the said pan at its margins and incloses the said salt table as well as the brine space or body of said pan, substantially as described.

7. A salt pan or evaporator provided above the brine level with a brine-discharging salt table at the margin of the pan adjoining a walk for the workmen and having a vapor-confining hood which fits the said pan at its margins, thus intervening between said salt table and said walk and inclosing the said salt table as well as the brine space or body of said pan, said hood having doors to give access from said walk to said pan for raking the salt from the bottom of the brine space or body of the pan on to the said salt table, substantially as described.

8. The combination of a pan, means for heating the same, a brine-discharging salt-holding receptacle above the brine level, and a vapor-confining hood which fits the said pan at its margins and incloses the salt-holding receptacle as well as the brine space or body of said pan, substantially as described.

9. The combination of a pan, means for heating the same, a brine-discharging salt-holding receptacle above the brine level at the margin of the pan, and a vapor-confining hood which fits the said pan at its margins and incloses the salt-holding receptacle as well as the brine space or body of said pan, substantially as described.

10. An elongated pan, whose bottom slopes to a long side, having longitudinal mains at different levels, the lower main in the deep part of the pan, and also having transverse heating coils within the brine space at an intermediate level so as to extend over the said sloping bottom, said coils being connected at their opposite ends with the respective mains, substantially as described.

11. A pan, in combination with heating coils within the brine space or body of said pan arranged with open-ended lane like spaces of a width to admit a salt-raking implement between adjacent coils, the coils terminating at a suitable distance from the pan's edge and being disconnected from each other so that the salt-raking implement may pass under and out from between the coils, substantially as described.

12. An elongated pan provided with a salt table at the margin of one of the long sides above the brine level and having the bottom sloping up to meet said table, in combination with longitudinal mains at different levels where the pan is deep and transverse heating coils within the brine space or body of said pan terminating at a suitable distance from the pan's edge and being arranged with open-ended lane like spaces of a width to admit a salt-raking implement between adjacent coils, the open ends of said spaces being next to the margin of said pan, substantially as described.

13. A pan having the heating coils within the brine space or body of the pan arranged with open-ended lane like spaces of a width to admit a salt-raking implement between adjacent coils, in combination with a vapor-confining hood which fits the margins of said pan and is provided with doors opposite the open ends of said lane like spaces, substantially as described.

14. A pan provided with a salt table at the margin above the brine level, in combination with the heating coils within the brine space or body of the pan arranged with open-ended lane like spaces of a width to admit a salt-raking implement between adjacent coils, and a vapor-confining hood which fits the margins of said pan and is provided with doors opposite the open-ends of said lane like spaces, substantially as described.

15. The combination of the elongated pan divided by partitions near one end into a preliminary heating chamber and a graining chamber communicating therewith, the brine feeding pipe emptying into said preliminary heating chamber, and the heating coils connected with the same supply circuit and arranged within the brine spaces of said chambers to heat both said chambers and to furnish a comparatively larger extent of heating surface in the said preliminary chamber, so that by the same steam the brine may be kept in ebullition in said preliminary heating chamber while it is quietly evaporated in the graining chamber, substantially as described.

16. The combination of the elongated evaporating pan divided by partitions near one end into a preliminary heating chamber and a graining chamber communicating therewith, the brine feed pipe emptying into said preliminary heating chamber, a main and a return main running lengthwise of the evaporator the return main at a lower level, the heating coils in the grainer at an intermediate level having their ends connected with said mains, and the heating coils of greater capacity in the preliminary heating chamber, substantially as described.

17. The combination with a grainer, and a preliminary precipitator, of an intermediate cleansing chamber connected with said precipitator and said grainer, and a hood inclosing said intermediate chamber and both the said grainer and the said precipitator, these latter being each provided with heating means, and said intermediate chamber being constructed and arranged for the repose of the brine on its way from the precipitator to the grainer, substantially as described.

In testimony whereof I have signed this specification in the presence of two witnesses.

HERMAN FRASCH.

Witnesses:
N. J. WORLEY,
T. W. LOTHMAN.